PHASE SHIFTER HAVING MEANS TO SIMULTANEOUSLY SWITCH FIRST AND SECOND REACTIVE MEANS BETWEEN A STATE OF CAPACITIVE AND INDUCTIVE REACTANCE

Filed April 29, 1965 2 Sheets-Sheet 1

INVENTOR.
JOSEPH F. WHITE
BY Alfred H. Rosen
Thomas N. Tarrant
ATTORNEYS

INVENTOR.
JOSEPH F. WHITE
BY Alfred H. Rosen
Thomas N. Tarrant
ATTORNEYS 3,491,314
PHASE SHIFTER HAVING MEANS TO SIMULTANEOUSLY SWITCH FIRST AND SECOND REACTIVE MEANS BETWEEN A STATE OF CAPACITIVE AND INDUCTIVE REACTANCE Joseph F. White, West Newton, Mass., assignor to Microwave Associates, Inc., Burlington, Mass., a corporation of Delaware Filed Apr. 29, 1965, Ser. No. 451,807
Int. Cl. H03h *7/18*
U.S. Cl. 333—31 14 Claims

ABSTRACT OF THE DISCLOSURE

This application discloses electric wave phase shifters in which pairs of varactor diodes, spaced between 70° and 110° of electrical wavelength apart, are coupled across a transmission line in circuit with inductive means, in combination with biasing and switching means which switch the diodes between two conductive states. In one of these states a net capacitive disturbance is introduced, while in the other state a net inductive disturbance is introduced.

This invention relates to phase shifters and in particular to electromagnetic wave phase shifters capable of high power wide band operation.

While phase shifters have a multitude of uses, one of the most critical is in phased array antenna systems. Antenna radiator design becomes increasingly complex and cumbersome as the demand for power handling capability and rapid steering speed increases. Phased arrays provide an obvious solution to this problem since the power capability is limited only by the number of subradiators and the beam may be directed at the switching speeds of its controlling electronic phase shifters.

Electronic phase shifters in transmission lines are commonly limited by one or more of the following difficiencies:

(1) Low power handling capability.

(2) High insertion loss (including both direct loading and reactive disturbances i.e. losses due to increase of the voltage standing wave ratio (VSWR)).

(3) Frequency distortion (requires narrow band operation).

(4) Bulk.

(5) Reliability.

(6) Expense.

Phase shifters can be obtained by adding capacitive and/or inductive reactance either in shunt or in series with a transmission line. If the ratio of series inductance to shunt capacitance could be maintained constant at each position along the line, standing waves would be minimized. However the design problems of adding series inductance and simultaneously the appropriate shunt capacitance make other approaches worthwhile.

When shunt reactance is added, the amount of phase shift is limited by the shunt current handling capacity as well as by the amount of allowable VSWR and frequency sensitivity. Increasing shunt reactance alone causes a mismatch or perturbation increasing both voltage standing wave ratio and frequency sensitivity of the line.

Power handling capability is increased by iterative phase shift components each producing only a small amount of the total shift. But each component added in a transmission line in general tends to increase line losses.

Phase shift circuits using an iterative approach with means for maintaining the inductance to capacitance ratio of the line constant are disclosed in U.S. patent application 343,689 filed Feb. 10, 1964, now Patent No. 3,290,624.

The present invention makes use of the fact that a moderate shunt reactance can be placed across a transmission line without significant increase in line losses provided a similar shunt reactance is placed across the line approximately one quarter wavelength away. No critical design problems are encountered when the line is deliberately periodically mismatched in this manner since the effects of the mismatch have been found to be self cancelling due to the quarter wave spaced pair(s). It has been found further that the maximum phase shift with the least restriction on bandwidth is obtained with a single controllable pair of reactances when the control varies them between similar values of inductive and capacitive reactance. Still further it has been found that power handling capability and bandwidth are increased for a given amount of phase shift while the VSWR is reduced by accomplishing the total phase shift with an iterative plurality of such pairs particularly if they fill consecutive quarter wavelengths of line. Thus it is an object of the present invention to define an electromagnetic wave phase shifter comprising a spaced pair of controllable reactances in a section of transmisison line.

It is a further object of the invention to define a variable high power electromagnetic wave phase shifter comprising iterative matched pairs of controllable reactances in a transmission line.

It is still a further object of the invention to define an electromagnetic wave phase shifter comprising a matched pair of reactance means which are simultaneously switchable between a net inductance value and a similar value of net capacitance.

Further objects and features of the invention will be understood upon reading the following description together with drawings in which.

A phase shifter as herein described is a means for shifting or changing the phase of a propagating electromagnetic wave as measured between two particular locations along a transmission line. It is distinguished from a delay line in which the phase is changed by the time in which the wave travels through what may be called a detour. A phase shifter may be loosely described as a reactive impedance inserted in a transmission line which makes the electrical (as opposed to the physical) length of the line look longer or shorter to a wave propagating along the line.

Unfortunately adding disturbing impedances (which may be, adding most anything) to a transmission line will generally reduce its efficiency both by resistive effects and by reflections. Losses due to reflection in a transmission line are kept to a minimum when the characteristic impedance of the line is constant along the line and matches the characteristic impedance of the source and the load.

In the circuit of the present invention a reactance is intentionally added to the line which unavoidably produces a reflective mismatch. A second similar reactance is then similarly added about one quarter wavelength away and has the net result of cancelling the mismatch affects of the first reactance as seen from the ends of the line provided both disturbances are moderate. As used herein disturbances are considered moderate provided the reflections introduced by them are not greater than in the order of twenty percent of the incident wave amplitude.

Figure 1:
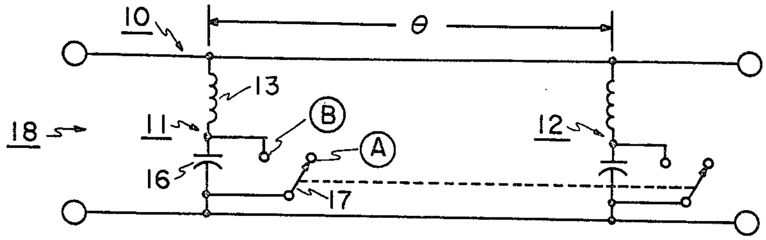
FIG. 1 is a schematic of a phase shifter in accordance with the invention.

Referring to FIG. 1, a transmission line 10 has connected across it a first impedance network 11 and a second impedance network 12 spaced an electrical distance $\theta$ apart. In this particular embodiment networks 11 and 12 are each depicted as an inductor 13, and a capacitor 16 connected in series across the line with a switch 17 connected to shunt capacitor 16 in its closed position. Capacitor 16 is selected to have a greater reactance magnitude than inductor 13 so that with switch 17 in position A, the network exhibits net capacity.

A wave 18, depicted as an arrow, propagating in line 10 encounters network 11 first. The shunt capacity of network 11 retards the phase of wave 18. Wave 18 acting on network 11 also generates a disturbance emanating as reflections from network 11. Similarly when wave 18 encounters network 12, the shunt capacity of network 12 further retards the forward going phase of the wave. Also wave 18 acting on network 12 generates a disturbance emanating as a reflection from network 12.

With network 12 spaced exactly one quarter wavelength ($\theta=90°$) from network 11, the disturbance from network 12 is generated approximately 90° out of phase with the disturbance generated from network 11. By the time the two disturbances meet across the one quarter wave separation, an additional 90° places them approximately 180° out of phase and substantial cancellation occurs between them.

It may be observed that network 11 has introduced a phase shift so that network 12 will appear to the propagating wave to be separated from network 11 by a distance different from the physical separation. To the extent this is so, the principal reflections (neglecting re-reflections) from network 11 and 12 will not be 180° out of phase with each other. Thus the greater the phase shift, the less perfect will be the cancellation when the two networks are separated by a quarter wavelength. Also since in its most common form the invention uses variable or switchable reactance devices, it is not practical to separate the networks at a distance that always will compensate for the phase shift. For perfect compensation it woud be necessary to switch the separation distance along with switching the reactance devices.

The above problem is not critical in the present invention because the phase shift produced by each network is small compared with a quarter wavelength and substantial cancellation of reflections still occurs with the one quarter wave separation. As a consequence, however, it must be understood that precise one quarter wave spacing of the network is not essential; and when the available reactances are not switched symmetrically around zero reactance, it is sometimes advantageous to separate the networks by a little more or a little less than one quarter wavelength. For example it has been found that separations in the range of 70° to 110° have provided substantial cancellation of reflection magnitudes as large as 20% of the incident wave amplitude.

In the description the controlling susceptances are described as being separated by a section of constant characteristic impedance transmission line about one quarter wavelength long. But, as was noted above, the reason for the line length was to achieve a 90° phase difference between the incident wave at network 11 and the perturbed incident wave at network 12. Therefore any two port network capable of this function could be used to replace the quarter wave transmision line. For example a lumped parameter phase delay section suitably designed might be used when a one quarter wave transmission line would be impractical for space or other reasons.

With switch 17 in position B, networks 11 and 12 exhibit net inductance so that a wave propagating in line 10 is advanced in phase, and similar reasoning to that above can be used to describe the circuit's operation.

Actually some capacitance and some inductance will be found in any network introduced across a transmission line. The network shown in FIG. 2 describes the electrical equivalent of the circuit illustrated simply in FIG. 1. When a diode is used as the control mechanism the switch function is performed by biasing a diode mounted across a microwave tranmission line at S band frequencies, for example. In general the mounting for the diode will contribute significant inductance and capacitance.

Figure 2:
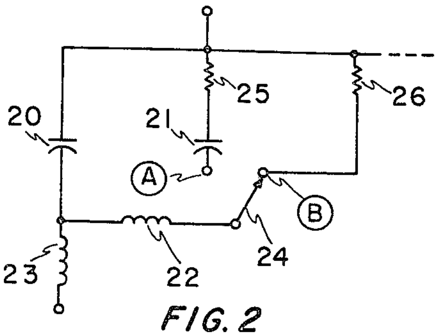
FIG. 2 is an approximate RF equivalent circuit for a switching diode connected across a transmission line.

Thus in FIG. 2 capacitor 20 represents capacity other than that furnished by the diode junction. Capacitor 21 represents the junction capacity with the diode reverse biased (switch 24 in position A). Inductors 22 and 23 represent inductance due to the mounting and "package" of the diode. Resistors 25 and 26 represent the reverse bias resistance and forward bias resistance respectively of the diode. At S band frequencies the inductance represented by inductors 22 and 23 is readily changed to meet any suitable value for the present invention by physical modifications of the diode mounting. Increasing the length of a metal mounting stud for example will increase inductance. (See FIG. 5.)

Figure 3:
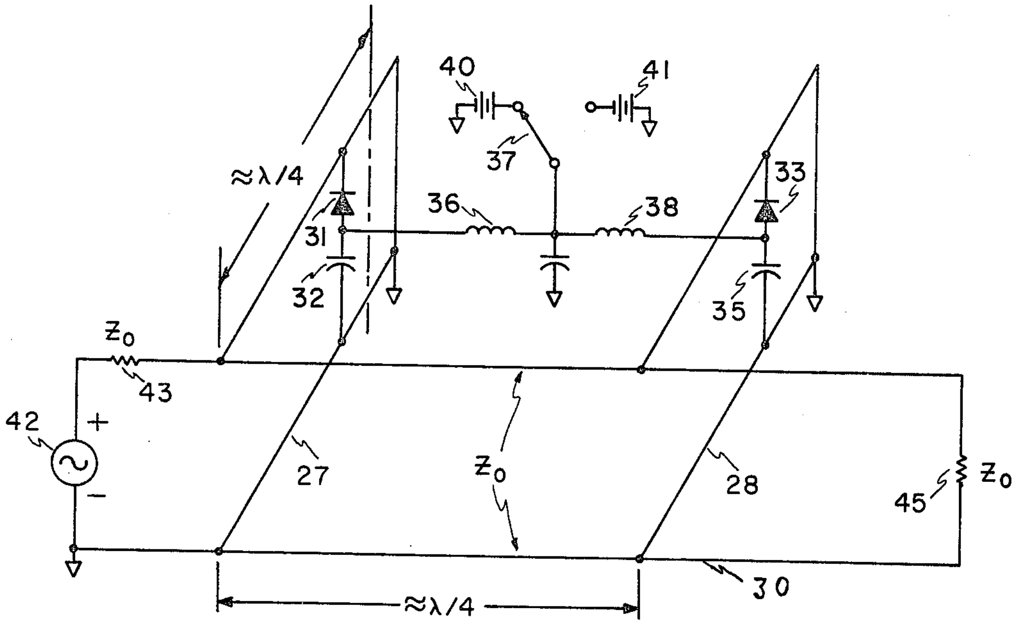
FIG. 3 is a schematic illustrating a particular embodiment of the invention which has been found suitable for L band use.

At L band frequencies the equivalent circuit of FIG. 2 is still applicable where a diode switch is used. However for L band greater capacity and inductance were found desirable than could be obtained by the diode and its mounting alone. Thus additional structure was needed an example of which is illustrated in FIG. 3. In FIG. 3 two shorted stubs 27 and 28 greater than one quarter wavelength long at the mean frequency of transmission line 30 are connected across the line about one quarter wavelength apart ($\lambda/4$). Switching diode 31 in series with DC blocking and series tuning capacitor 32 is connected across stub 27 less than one quarter wavelength along stub 27 from transmission line 30. Similarly second switching diode 33 in series with DC blocking and series tuning capacitor 35 is connected across stub 28 at the same position along stub 28 as diode 31 is along stub 27. The common connection of diode 31 and capacitor 32 is connected further through an RF choke 36 to bias switch 37. The common connection of diode 33 and capacitor 35 is likewise connected through RF choke 38 to bias switch 37. Switch 37 is connected to select one of two potentials represented by a positive battery 40 and a negative battery 41. Generator 42 and resistor 43 represent an RF source matched to line 30 and resistor 45 represents a load impedance matched to the line.

The operation of FIG. 3 is based on the fact that an exact quarter wave shorted stub reflects an infinite impedance to the line while a stub less than or more than a quarter wave reflects a reactance. When the shorted stub is less than a quarter wavelength it shunts the line with an inductive reactance and when the shorted stub is more than a quarter wavelength it shunts the line with a capacitive reactance. Thus in FIG. 3 to switch between an equivalent capacitive reactance and an equivalent inductive reactance, the diodes 31 and 33 are positioned in their respective stubs so that one quarter wavelength from line 30 along the respective stub lies between the respective diode and the shorted end of the stub. When the diodes are forward biased by the appropriate position of switch 37 the stubs are effectively shorted at the diode position of less than a quarter wavelength and shunt line 30 with inductive susceptances. When the diodes are reverse biased by the opposite position of switch 37 the stubs are shorted at their ends at more than a quarter wavelength and shunt line 30 with capacitive susceptances.

As in the description of FIG. 1, the phase of a wave propagating down the transmission line is retarded if a capacitive susceptance shunts the line and is advanced if an inductive susceptance shuits the line. Spacing the two stubs about a quarter wavelength apart provides substantial cancellation of the reflected disturbances as was described previously. The exact length of the stubs relative to a wavelength is determined by the amount of phase shift required. Generally it has been found that about 57° of phase shift per pair of shunt susceptance can be obtained over a bandwidth that is 10% of the mean frequency without exceeding a 1.5 VSWR.

As the amount of shunt susceptance is increased to get greater amounts of phase shift the current flowing through the switching device increases. Also greater added susceptance raises the standing wave ratio since perfect cancellation of reflections is difficult to obtain and impossible to achieve over a wide band. For low power applications the phase shift from one pair of shuit susceptances can be varied by using a continuously variable reactance device or variable resistance device such as varactor and varistor semiconductors in place of the switch elements shown in FIGS. 1 and 2.

Figures 4, 5:
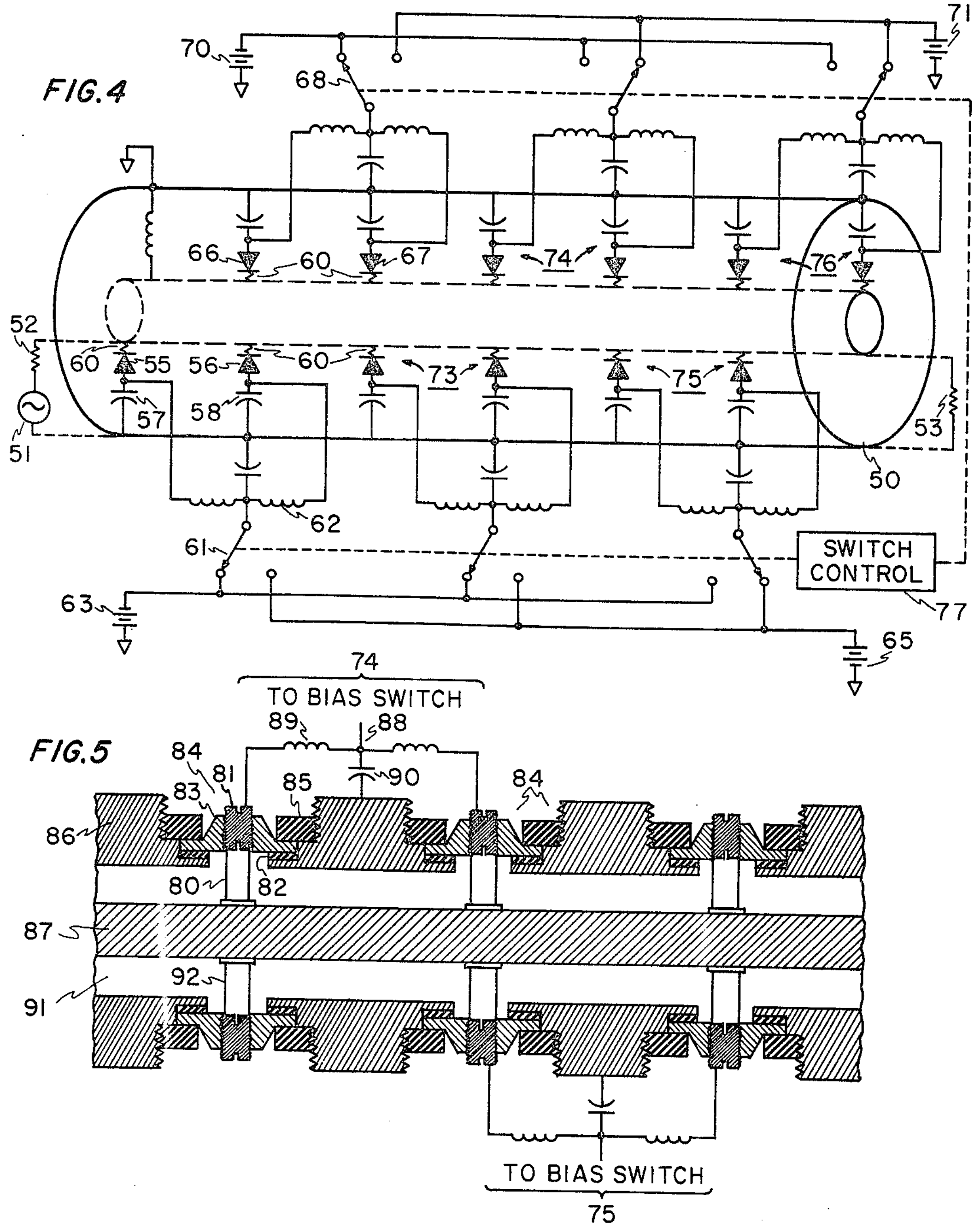
FIG. 4 is a schematic partially diagrammatic of the inventive phase shifters in iterative pairs along a section of coaxial waveguide.
FIG. 5 is a longitudinal section of a segment of S-band line in accordance with FIG. 4.

PIN switching diodes will carry more current than varactors or varistors and by using a multitude of iterative pairs the amount of phase shift and the current handled by each pair can be reduced. Thus FIG. 4 shows a section of coaxial waveguide 50 for S band operation using iterative pairs of PIN diodes positioned between the inner and outer cylinders. Generator 51 and resistor 52 indicate a microwave generator matched to the waveguide and resistor 53 represents a load impedance as a matched termination. A first pair of susceptances is comprised of diode 55 and diode 56. Diode 55 is coupled between the inner and outer cylinders of waveguide 50 in series with a capacitor 57 serving to block the DC biasing current for the diode as well as to provide series tuning. Diode 56 is connected similarly between the inner and outer cylinders of waveguide 50 in series with a blocking capacitor 58. As discussed in relation to FIG. 2 the mountings for the capacitors provide a significant inductive effect at S band frequencies. This is represented in FIG. 4 by depicting the mounting studs as coils 60. Switch 61 is connected to one electrode on each of diode 55 and 56 through RF chokes 62 for biasing the diodes negative by biasing supply 63 or positive by biasing supply 65. A second pair of shunt susceptances is provided by diodes 66 and 67 connected between the inner and outer cylinders of the wave guide at a different circumferential position relative to the first pair. This pair is also switchable by a switch 68 between a negative bias source 70 and a positive bias source 71. In the first pair of susceptances, diodes 55 and 56 are spaced from each other along the length of the waveguide by about one quarter wavelength. Diode 66 of the second pair of susceptances is positioned at the same longitudinal position in the waveguide as diode 56 but in a different circumferential position. Diode 67 is spaced along the length of the waveguide approximately one quarter wavelength from diode 66. The susceptances are repeated iteratively with a third pair 73, a fourth pair 74, a fifth pair 75 and a sixth pair 76. Pairs 73 and 75 are positioned in the same circumferential position as the first pair comprised of diodes 55 and 56. Pairs 74 and 76 are positioned in the same circumferential position of the waveguide as the second pair of susceptances comprised of diodes 66 and 67. Thus, in each of the two circumferential positions occupied by pairs of susceptances, there is a switchable susceptance positioned at approximately every quarter wavelength along the section of waveguide. Further pairs of susceptances can be added in the same way in further sections of line bearing in mind that the approximate one quarter wavelength spacing is preferably maintained. A switch control device 77 is connected to each of the switches 61, 68 and those of pairs 73 to 76. The purpose of this control is to operate the switches so that when more than one pair of susceptances is switched, each further pair will cover the next successive quarter length of waveguide. Thus, for example, to secure the phase shift obtained by switching two pairs of susceptance, the first two pairs operated by switches 61 and 68 could be utilized. The next additional increase in phase shift could be obtained by switching in pair 73 and then 74. If one of these is left unswitched and then a later one along the length of the waveguide is switched, a small increase in the standing wave ratio will result. The combined effect of adjacent installation of sections and the switching of successive pairs simultaneously theoretically give the least increase in standing wave ratio and in fact has very little effect. Thus with the arrangement of FIG. 4 an infinite amount of phase shift can be introduced while handling large quantities of RF power with relatively little effect on the standing wave ratio.

FIG. 4 has been described in an embodiment in which switch control 77 operates to insure that no pair of susceptances is left in one condition while pairs on both sides of it are in a different condition. The preference for this arrangement is eliminated when the switching is between two equal values of reactance magnitude. Thus if one quarter wavelength of line separates two inductive susceptances and the following quarter wavelength separates two capacitive susceptances where the values of capacity and inductance are approximately equivalent, the VSWR will be kept to a minimum just as though the successive susceptances were all capacitive or all inductive. With symmetrical capacitive and inductive susceptances the switching of successive pairs can be in any random arrangement to give the desired amount and direction of phase shift. When the susceptances are asymmetrical, the switching of pairs is preferably so that all pairs switched to give a particular direction of phase shift are in unbroken succession. A longitudinal section of a coaxial transmission line in accordance with the embodiment of FIG. 4 is illustrated in FIG. 5. Switchable susceptance pairs 74 and 75 have the same numbers as in FIG. 4 for ease of comparison. One of the susceptances of pair 74 will be described in detail. The others are made in the same way. The switching element is a diode 80. A PIN switching diode has been found particularly suitable. Diode 80 is inserted through hole 84 in the outer conductor 86 of the coaxial line. One electrode of diode 80 makes electrical contact by resting against the inner conductor 87 of the line. The second electrode of diode 80 faces outward in the center of hole 84 in conductor 86. An electrically insulating washer 82 sits in the bottom of hole 84 against a lip. A conductive support member 83 sits in hole 84 against washer 82. An electrically insulating retaining ring 85, threaded to mesh with internal screw threads in hole 84, screws down to clamp member 83 tightly against washer 82. A screw cap 81 screws down through an internally threaded central axial hole in support member 83 to contact and clamp the outward facing electrode of diode 80.

It will be seen that washer 82 and retainer ring 85 electrically insulate screw cap 81 from outer conductor 86. A wire lead 88 connects screw cap 81 to a DC bias control (see FIG. 4) for the diode. An RF choke 89 and a bypass capacitor 90 keep RF energy out of the bias supply.

The DC blocking and series tuning capacitor, illustrated for example as capacitor 57 in FIG. 4, is supplied in FIG. 5 by washer 82 as the dielectric between the lip portion of outer conductor 86 and conductive support member 83. Tuning is accomplished by changing washer 82 for washers of any desired thickness. The inductance depicted as coil 60 in FIG. 4 is supplied in FIG. 5 by the metal cap of diode 80 resting against inner conductor 87. Further inductance can be supplied by the extent to which a sleeve portion of screw cap 81 extends inward over diode 80.

Inner conductor 87 of the coax line is spaced from outer conductor 86 by space 91 which is suitably an air space. It may also be here a filling of dielectric material with holes in which diodes 80, 92, etc. are inserted.

The position of diodes 80 and 92 as depicted in FIG. 5 is not necessarily 180° displaced one from the other around the cross-sectional circumference of the line. Other relative circumferential positions can be determined by convenience in the particular apparatus contemplated.

While the invention has particular application for directional scanning in antenna arrays and has been illustrated with regard to specific embodiments in which it has been found useful for that purpose, it is to be understood that the inventive concept is applicable to a wide variety of uses requiring phase shift in electromagnetic wave transmission and switching devices other than the semiconductor diodes depicted can be utilized within the scope of the invention. Thus it is intended to cover the invention broadly within the spirit and scope of the appended claims.

What is claimed is:

1. An iterative microwave phase shifter comprising:
(a) a section of microwave transmission line having an electrical length of at least a plurality of quarter wavelengths at its mean frequency;
(b) an iterative grouping of phase shifting components arranged in said section each component comprising first and second reactance means spaced substantially one quarter electrical wavelength apart at said mean frequency;
(c) means to mount the first reactance means of each successive component in substantially the same electrical location as the second reactance means of the preceding component; and,
(d) means to control any unbroken sequence of said components simultaneously between at least two states of reactance.

2. An iterative phase shifter according to claim 1 in which one of said two states of reactance is capacitive and the other of said two states of reactance is inductive.

3. An iterative microwave phase shifter according to claim 2 in which said two states of reactance are equal in absolute value.

4. Means to selectively shift the phase of electromagnetic energy flowing in a transmission line having a characteristic frequency comprising:
(a) first reactive means coupled across said line at a first point;
(b) second reactive means coupled across said line at a second point separated from said first point by 70° to 110° of an electrical wavelength at said characteristic frequency; and,
(c) means to switch said first reactive means and said second reactive means simultaneously between a state of capacitive reactance and a state of inductive reactance at said characteristic frequency.

5. Means to selectively shift the phase of electromagnetic energy according to claim 4 in which said first reactive means comprises a PIN switchable diode in circuit with inductive means, and said second reactive means comprises a PIN switchable diode in circuit with inductive means, and switching means is coupled to both diodes.

6. Means to selectively shift the phase of electromagnetic energy according to claim 4 in which said first reactive means and said second reactive means are repeated in iterative pairs wherein the first reactive means of each successive pair is physically located in said transmission line at the same longitudinal position as the second reactive means of the preceding pair.

7. Means to selectively shift the phase of electromagnetic energy according to claim 4 in which said state of capacitive reactance and said state of inductive reactance have substantially equal absolute values of reactance.

8. Means to selectively shift the phase of electromagnetic energy according to claim 4 in which each of said reactive means reflects in the order of 20% of the energy flowing in said line and the net reflection as viewed from the ends of the line is substantially zero.

9. Means to selectively shift the phase of electromagnetic wave energy traveling in a transmission line having a characteristic frequency comprising:
(a) a first pair of identical reactive disturbance means coupled to said line about 70° to 110° of electrical wavelength apart at said characteristic frequency;
(b) a plurality of additional pairs of identically spaced reactive disturbances coupled consecutively to said line so that the first disturbance means of each pair is in the same longitudinal position along said line as the second disturbance means of the preceding pair;
(c) means to switch each of said first pair and said additional pairs between a value of net inductance and a value of net capacitance; and,
(d) means to control said switching whereby a plurality of said pairs can be switched simultaneously.

10. Means to selectively shift the phase of electromagnetic wave energy according to claim 9 in which said value of net capacitance is equal in magnitude to said value of net inductance.

11. Means to selectively shift the phase of electromagnetic wave energy according to claim 9 in which said means to control is operative to insure that all of said pairs switched to a given condition of reactance are consecutive pairs.

12. Means to selectively shift the phase of electromagnetic wave energy according to claim 9 in which each disturbance means reflects in the order of 20% of the energy traveling in said line and the net reflection as viewed from the ends of said line is substantially zero.

13. An electromagnetic wave phase shifter for shifting the phase of electromagnetic wave energy traveling in a transmission line and having a characteristic frequency comprising:
(a) a length of electromagnetic wave transmission line;
(b) first and second semiconductor diodes each having a first state of conduction and a second state of conduction and exhibiting a larger net capacitive characteristic in said first state of conduction than in said second state of conduction;
(c) inductive connecting means connecting each of said diodes across said transmission line separated from each other about 70° to 110° of electrical wavelength at said characteristic frequency;
(d) means to switch said diodes between said first state of conduction and said second state of conduction simultaneously;
(e) said diodes and said connecting means together having respective capacitive and inductive characteristics such that when said diodes are in said first state of conduction said connecting means and said diodes coact to effect a net capacitive disturbance in said line, and when said diodes are in said second state of conduction said connecting means and said diodes coact to effect a net inductive disturbance in said line.

14. A phase shifter according to claim 13 in which the absolute magnitudes of the capacitance of said capacitive disturbance and the inductance of said inductive disturbance are substantially equal.

(References on following page)

References Cited

UNITED STATES PATENTS

| | | | |
|---|---|---|---|
| 3,178,659 | 4/1965 | Smith et al. | 333—7 |
| 2,743,367 | 4/1956 | Felch et al. | 333—31 X |
| 2,959,778 | 11/1960 | Bradley | 333—7 X |
| 3,109,152 | 10/1963 | Dachert | 333—31 |
| 3,177,433 | 4/1965 | Simon et al. | 307—88.5 X |
| 3,246,265 | 4/1966 | Smith-Vaniz | 333—31 |

OTHER REFERENCES

Assaly, Some Designs of X-Band Diode Switches, IEEE Trans. on MTT, November 1966, pp. 553–563.

Dawirs et al., A Very Fast, Voltage-Controlled, Microwave Phase Shifter, The Microwave Journal, June 1962, pp. 99–106.

"Micronotes, Microwave Assoc. Semiconductor Div., October 1963, pp. 1 and 2 relied on.

HERMAN KARL SAALBACH, Primary Examiner

PAUL L. GENSLER, Assistant Examiner

U.S. Cl. X.R.

333—97